(12) United States Patent
Krude et al.

(10) Patent No.: US 7,462,107 B2
(45) Date of Patent: Dec. 9, 2008

(54) CONSTANT VELOCITY FIXED JOINT

(75) Inventors: Werner Krude, Neunkirchen-Seelscheid (DE); Peter Harz, Hennef (DE)

(73) Assignee: GKN Driveline International GmbH, Lohmar (DE)

( * ) Notice: Subject to any disclaimer, the term of this patent is extended or adjusted under 35 U.S.C. 154(b) by 109 days.

(21) Appl. No.: 11/363,020

(22) Filed: Feb. 27, 2006

(65) Prior Publication Data

US 2006/0142089 A1    Jun. 29, 2006

Related U.S. Application Data

(63) Continuation-in-part of application No. 10/433,638, filed as application No. PCT/EP01/13499 on Nov. 21, 2001, now abandoned.

(30) Foreign Application Priority Data

Dec. 4, 2000    (DE) .............................. 100 60 220

(51) Int. Cl.
    *F16D 3/224*    (2006.01)
(52) U.S. Cl. ...................... 464/145; 464/906
(58) Field of Classification Search .................. 464/906, 464/140–146
    See application file for complete search history.

(56) References Cited

U.S. PATENT DOCUMENTS

| | | | |
|---|---|---|---|
| 3,475,924 A | 11/1969 | Aucktor | |
| 4,529,254 A | 7/1985 | Krude | |
| 4,820,240 A * | 4/1989 | Girguis | .................. 464/145 |
| 4,950,206 A | 8/1990 | Jacob | |
| 4,968,287 A | 11/1990 | Jacob | |
| 5,067,929 A | 11/1991 | Krude | |
| 5,288,273 A | 2/1994 | Krude | |
| 5,782,696 A | 7/1998 | Guimbretiere | |
| 6,319,133 B1 | 11/2001 | Schwarzler et al. | |

FOREIGN PATENT DOCUMENTS

DE    1 888 007    2/1964

(Continued)

OTHER PUBLICATIONS

F. Schmelz, H.-CH. Graf V. Sererr-Thoss, E. Aucktor; Gelenke und Gelenkwellen; Berechnung, Gestaltung, Anwendungen; Mit 179 Abbildungen und 55 Tabellen; Springer-Vertag, Berlin, Heidelberg, New York, London, Paris, Tokyo; 1988.

*Primary Examiner*—Greg Binda
(74) *Attorney, Agent, or Firm*—Rader, Fishman & Grauer, PLLC

(57) ABSTRACT

A constant velocity fixed joint having an outer and inner joint part forming pairs of ball tracks, wherein the track base lines of the pairs of tracks each form an opening angle relative to one another. The track base lines of the outer ball tracks, at the attaching part end, form a radius whose center is positioned on a first longitudinal axis and is offset by a first offset from the central plane of the outer joint part towards the attaching part. The track base lines of the inner ball tracks, at the aperture end, comprise a radius whose center is positioned on the second longitudinal axis and is offset by a second offset from the central plane of the inner joint part towards the aperture.

5 Claims, 16 Drawing Sheets

FOREIGN PATENT DOCUMENTS

| | | |
|---|---|---|
| DE | 4031819 | 3/1992 |
| JP | 4228925 | 8/1992 |
| JP | 11236926 | 8/1999 |
| WO | WO 00/31427 | 6/2000 |
| WO | WO 00/60248 | 10/2000 |

\* cited by examiner

CONSTANT VELOCITY FIXED JOINT

CROSS-REFERENCE TO RELATED APPLICATION

This application is a Continuation-In-Part of U.S. Pat. application Ser. No. 10/433,638 entitled "Homocinetic Fixed Joint" and filed on Jan. 8, 2004 now abandoned.

BACKGROUND OF THE INVENTION

The invention relates to the field of constant velocity universal joints. In principle, such joints comprise an outer joint part with an aperture and an attaching part, an inner joint part into which there is inserted a shaft which emerges from the aperture, torque transmitting balls guided in pairs of tracks in the outer joint part and in the inner joint part, as well as a ball cage which holds the balls in a central plane when the joint is in the aligned condition and in an angle-bisecting plane when the joint is articulated. The angle of articulation of the joint is normally delimited by the shaft stopping against the outer edge of the aperture of the outer joint part.

With a view to achieving the largest possible angle of articulation, it has been found that those joints are advantageous which comprise pairs of tracks whose opening angle opens from the attaching part towards the joint aperture, i.e. whose track base lines diverge from one another if viewed in said direction. However, such joints are disadvantageous in respect of the strength of the joint.

As far as the joint strength is concerned, joints with pairs of tracks whose opening angle opens from the joint aperture to the attaching part, i.e. wherein the base track lines diverge from one another if viewed in said direction, are more advantageous. Joints of this type are the subject of the present invention.

A first group of prior art joints have all pairs of tracks whose opening angle opens from the joint aperture to the attaching part. In such joints, the strength of the outer joint part is greatly improved, but the load on the ball cage continues to be unchanged and high.

In addition, a second group of prior art joints provide only some of the pairs of tracks whose opening angle opens from the joint aperture to the attaching part. In such joints, the strength of the outer joint part has been improved and the load on the ball cage has been reduced.

As compared to the joints with tracks whose opening angle opens from the attaching part towards the joint aperture mentioned first, the strength of the first and second groups of prior art joints has been improved, but there are limitations as far as the angle of articulation is concerned.

SUMMARY OF THE INVENTION

The present invention achieves greater angles of articulation in a constant velocity fixed joint, while providing improved strength as compared to prior art joints. The design, in accordance with the invention, provides that pairs of tracks open towards the attaching side and, respectively, the attaching part.

The species of joints to which the present invention can be used to advantage are characterized by the following features: an outer joint part having a first longitudinal axis and an attaching part or attaching end and an aperture for entrance of a shaft which are axially opposed relative to one another, and outer ball tracks; an inner joint part having a second longitudinal axis and inner ball tracks. The outer ball tracks have center lines and track base lines which extend at equal distances therefrom, which are curved and extend in planes through the first longitudinal axis. The inner ball tracks have center lines and track base lines which extend at equal distances therefrom, which are curved and extend through the second longitudinal axis. The outer ball tracks and the inner ball tracks form pairs of tracks with one another which each receive a torque transmitting ball. A ball cage is positioned between the outer joint part and the inner joint part and comprises circumferentially distributed cage windows which each receive a torque transmitting ball. The centers of the balls are held by the cage in a central plane when the joint is in an aligned condition, and when the joint is in an aligned condition, the center lines of the pairs of tracks are mirror-symmetrical relative to one another with reference to said central plane. The track base lines of the pairs of tracks form an opening angle with one another, i.e. they diverge from one another. A first group of joints only comprises pairs of tracks whose track base lines diverge from one another running from the aperture to the attaching part, i.e. whose opening angle opens from the aperture towards the attaching end/attaching part. Such so-called UFA joints are shown in FIGS. 1 and 2.

A second group of joints are also disclosed, wherein only at one part of the pairs of tracks, more particularly at each second one of the pairs of tracks, if viewed across the circumference, comprises track base lines which diverge from one another from the aperture to the attaching end/attaching part, i.e. which form an opening angle which opens in said direction. Such so-called UFC joints are shown in FIGS. 3 and 4.

The definitions given below refer only to the inventive pairs of tracks whose opening angle widens from the aperture to the attaching end/attaching part. To the extent that there are, in addition, pairs of tracks which widen from the attaching end/attaching part towards the aperture, these do not necessarily have to comply with the definitions in accordance with the invention and can be designed to deviate therefrom. The opening angle is always the angle between the tangents at the balls in the track contact points.

According to a first solution in accordance with the invention, the track base lines of the outer ball tracks of the pairs of tracks, at the attaching part end, form a radius ra whose center is positioned on the first longitudinal axis so as to be offset by a first offset OFF from the central plane of the outer joint part towards the attaching part, and diverge from a circle with said radius ra outwardly when running towards the aperture end. The track base lines of the inner ball tracks of the pairs of tracks, at the aperture end, comprise a radius ri whose center is positioned on the second longitudinal axis so as to be offset by a second offset OFF2 from the central plane of the inner joint part towards the aperture, and diverge from a circle with said radius ri outwardly when running towards the attaching part end.

According to a further solution, the track base lines of the outer ball tracks of the pairs of tracks, continuously, comprise a radius ra whose center is positioned beyond the first longitudinal axis and offset by a first offset OFF from the central plane of the outer joint part towards the attaching part. The track base lines of the inner ball tracks of the pairs of tracks, continuously, comprise a radius ri whose center is positioned beyond the second longitudinal axis and offset by a second offset OFF2 from the central plane of the inner joint towards the aperture.

According to a third solution, the track base lines of the outer ball tracks of said pairs of tracks, at the attaching part end, comprise a radius ra whose center is positioned beyond the first longitudinal axis and offset by a first offset OFF from the central plane of the outer joint part towards the attaching part, and diverge from a circle with said radius ra outwardly when running towards the aperture end. The track base lines of the inner ball tracks of the pairs of tracks comprise a radius ri whose center is positioned beyond the second longitudinal axis and offset by a second offset OFF2 from the central plane of the inner joint part towards the aperture, and diverge from a circle with said radius ri outwardly when running towards the attaching part end.

According to further embodiments of the first and third solutions, the track base lines each include a circular-arch-shaped portion with the radius ra, ri and a tangentially adjoining straight line portion. According to a further embodiment, the track base lines each comprise a circular-arch-shaped portion with the radius ra, ri and a tangentially adjoining second circular-arch-shaped portion with the radius Rae, Rie which is greater than the radius ra, ri. According to a further modification, the track base lines can each include a circular-arch-shaped portion with the radius ra, ri and a circular-arch-shaped portion with the radius r1a, r1i curved in the opposite direction, and a tangentially adjoining straight line. According to a further embodiment, the track base lines can each include a circular-arch-shaped portion with the radius ra, ri, a tangentially adjoining straight line portion, a circular-arch-shaped portion curved in the direction opposite to that of the portion and having the radius r1a, r1i, and a tangentially adjoining straight line.

The joint strength in the outer joint part is increased because the apex of the track curvature of the outer ball tracks is far removed from the aperture, whereas the joint articulation angle is relatively increased due the outer ball tracks development towards the aperture.

BRIEF DESCRIPTION OF THE DRAWINGS

For a more complete understanding of the invention, reference should be made to the embodiments described below by way of examples, with reference to the accompanying drawings wherein.

DETAILED DESCRIPTION

Figure 1:
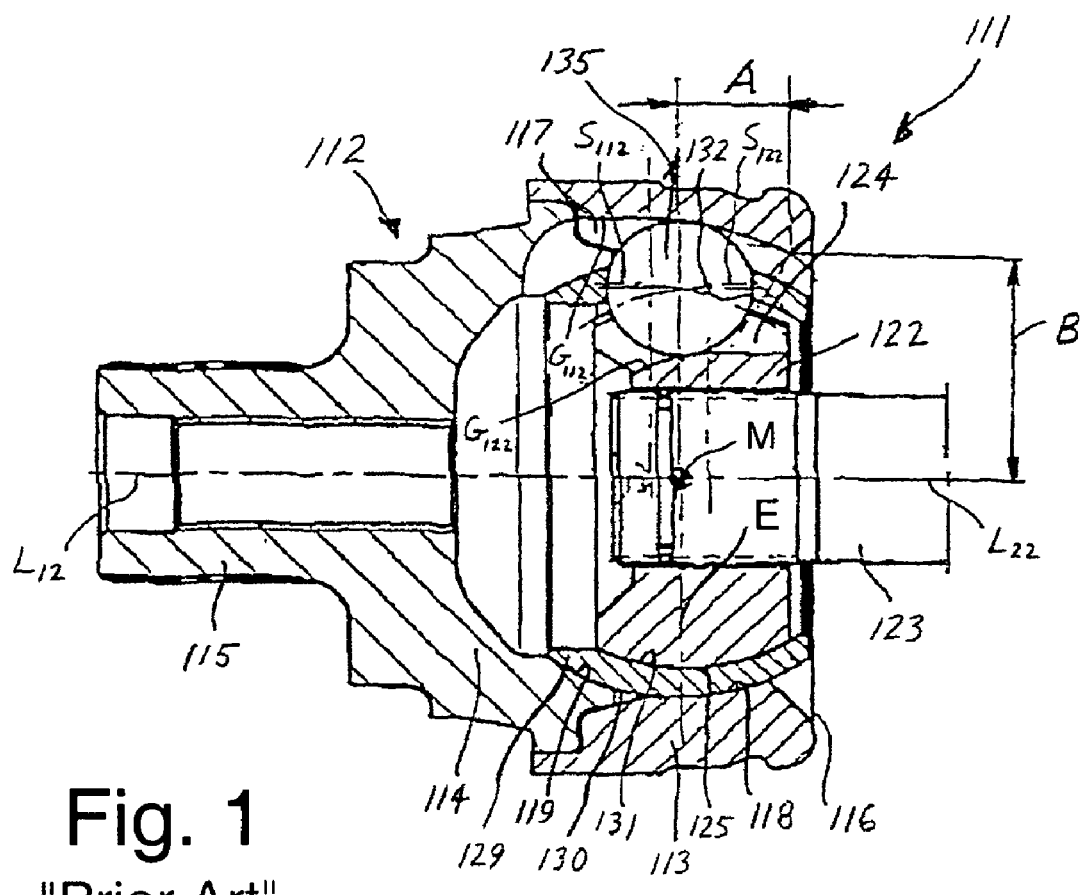
FIG. 1 shows a first example of joint according to the state of the art wherein all pairs of tracks diverge from the joint aperture towards the attaching part.

FIG. 1 shows a conventional constant velocity universal joint 111 with an outer joint part 112 which is in two parts: an annular part 113, an attaching part 114 with a journal 115. The annular part 113 forms a joint aperture 116. Inside the annular part there are provided outer ball tracks 117 which extend into the attaching part 114. In the outer joint part 112, there is positioned an inner joint part 122 into which there is inserted a shaft 123. Inner ball tracks 124 are provided at the inner joint part 122. The outer joint part 112 has an inner spherical guiding face 118 in the annular part and a complementary guiding face portion 119 in the attaching part. The inner joint part 122 has an outer spherical guiding face 125. Between the inner guiding face 118 and the outer guiding face 125 there is positioned a ball cage 129 which has spherical sliding faces 130, 131 which cooperate with the guiding faces 118, 119, 125. The ball cage has circumferentially distributed cage windows 132 which each accommodate a ball 135. The balls each engage pairs of tracks which are formed of outer ball tracks 117 and inner ball tracks 124. A central plane E which extends through the ball centers and which is positioned perpendicularly on the axes L12, L22, by means of its point of intersection with the axes, defines the joint center M. The track base lines G12, G22 of the ball tracks 117, 124 diverge from one another from the aperture 116 to the attaching part 114. The track center lines S12, S22 are substantially formed by circular arches with adjoining tangents whose centers are positioned on the axes L12, L22 and are offset in opposite directions relative to the joint center M. The reference "A" refers to the axial distance between the joint center M and the point of contact of the ball 135 with the outer ball track 117 in the outer joint part 112 at the maximum articulation angle of the joint. The reference "B" refers to the radial distance between the axis L12 and the point of contact of the ball 135 with the outer ball track 117 in the outer joint part 112 at the maximum articulation angle. The maximum articulation angle of the joint is determined by the shaft stopping at the outer joint part, and by the end of the effective guidance of the ball 135 in the outer ball track 117 in the outer joint part 112. In the joint shown in FIG. 1, with a round cross-sectional track shape, the point of contact is located in the track base. In joints with other cross-sectional track shapes, it is possible for pairs of contact points to be positioned opposite one another in the track flanks. The joint can have an even or uneven number of pairs of tracks which are identical across the circumference and which look like the pair of tracks shown in section.

Figure 2:
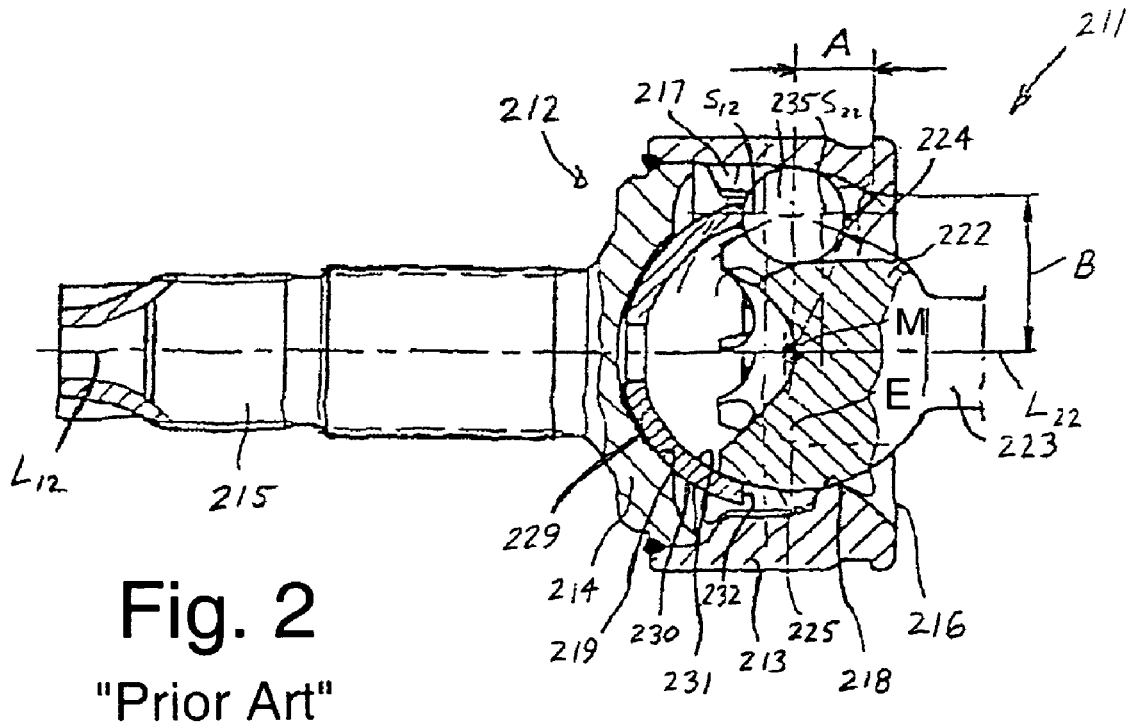
FIG. 2 shows a second example of a joint according to the state of the art wherein all pairs of tracks diverge from the joint aperture to the attaching part.

FIG. 2 shows a conventional constant velocity universal joint 211 having an outer joint part 212 which is in two parts: an annular part 213, an attaching part 214 with a journal 215. The annular part 213 forms a joint aperture 216. Inside the annular part there are formed outer ball tracks 217. In the outer joint part 212, there is positioned an inner joint part 222 which is followed by an integrally formed-on shaft 223. The inner joint part 222 is provided with inner ball tracks 224. The outer joint part 212 has an inner spherical guiding face 218 in the annular part and a guiding face 219 in the attaching part 214. The inner joint part 222 has an outer spherical guiding face 225. A first guiding region of the guiding face 225 is in direct contact with the guiding face 218. Between the inner guiding face 219 and a second guiding region of the outer guiding face 225, there is positioned a semi-dish-shaped ball cage 229 having spherical sliding faces 230, 213 which cooperate with the guiding faces 218, 219, 225. The ball cage has a cage edge 232 which supports a corresponding ball 235. The balls each engage pairs of tracks which are formed of outer ball tracks 217 and inner ball tracks 224. A plane E which extends through the ball centers and which is positioned perpendicularly on the axes L12, L23, by means of its point of intersection with the axes, defines the joint center M. The track base lines G12, G22 of the ball track 217, 224 diverge from one another from the aperture 216 to the attaching part 214. The track center lines S21, S22 are formed substantially by circular arches with adjoining tangents, whose centers are positioned on the axes L12, L23 and are offset in opposite directions relative to the joint center M. The reference "A" refers to the axial distance between the joint center M and the point of contact of the ball 235 with the outer ball track 217 in the outer joint part 212 at the maximum joint articulation angle. The reference "B" refers to the radial distance between the axis L12 and said point of contact of the ball 235 with the outer ball track 217 in the outer joint part 212 at the maximum joint articulation angle. The maximum articulation angle of the joint is determined by the shaft stopping against the outer joint part 212 and by the end of the effective guidance of the ball 235 in the outer ball track 217 in the outer joint part 212. In the joint shown in FIG. 2, with a round cross-sectional track shape, the point of contact is located in the track base. In joints with other cross-sectional track shapes, it is possible for pairs of contact points to be positioned opposite one another in the track flanks. The joint can have an even or uneven number of pairs of tracks which are identical around the circumference and which look like the pair of tracks shown in section.

Figure 3:
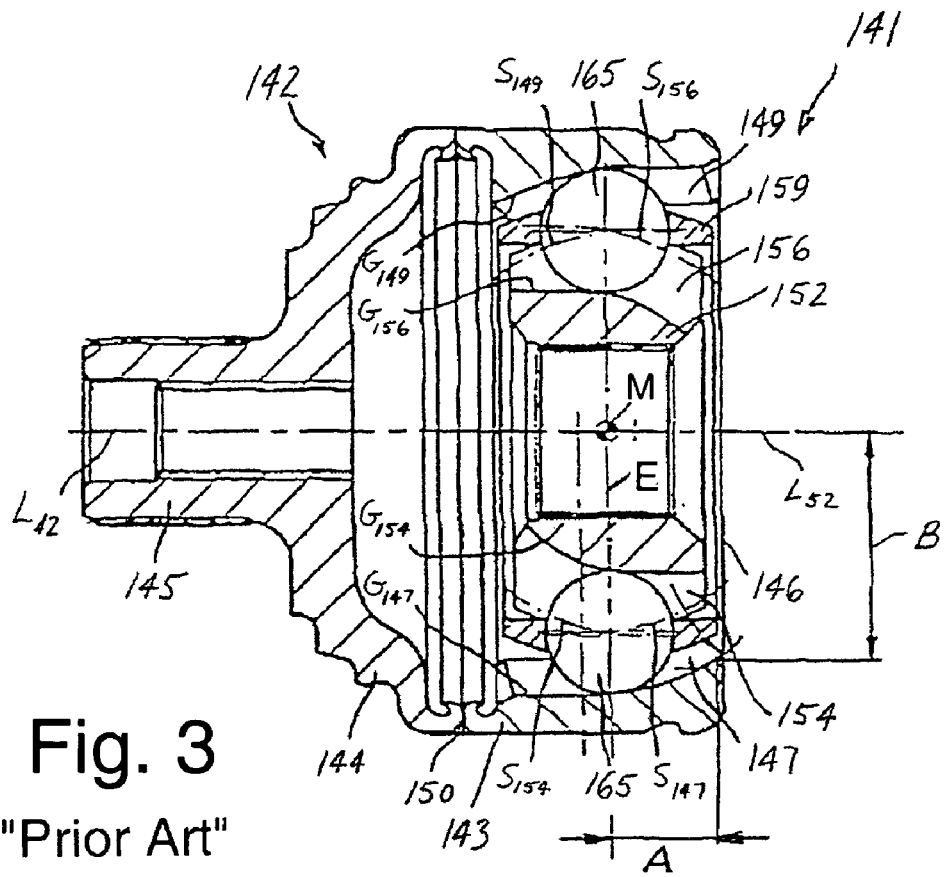
FIG. 3 shows a first example of a joint according to the state of the art wherein some of the pairs of tracks diverge from the joint aperture to the attaching part.

FIG. 3 shows a conventional joint 141 whose outer joint part 142 has an annular part 143 and an attaching part 144. The attaching part 144 has an integrally attached journal 145. The annular part 143 and the attaching part 144 are connected to one another by a friction weld 150. In the outer joint part 142 there is arranged an inner joint part 152. Between the outer joint part 142 and the inner joint part 152, there is positioned a ball cage 159 with circumferentially distributed cage windows 162 in which there are received balls 165. The outer joint part and inner joint part form first pairs of tracks consisting of outer ball tracks 147 and inner ball tracks 154 whose track base lines G147, G154 diverge from the joint aperture 146 to the attaching part 144; as well as second pairs of tracks consisting of outer ball tracks 149 and inner ball tracks 156 whose track base lines G149, G156 diverge from the attaching part 144 to the joint aperture 146. The center lines S147, S154, S149, S156 of the ball tracks each consist of circular arches with adjoining tangents, whose centers are positioned on the axes L42, L52 so as to be offset in opposite directions from the joint center M. Reference "A" refers to the axial distance between the joint center M and the point of contact of the ball 165 with the outer ball track 147 in the outer joint part 142 at the maximum joint articulation angle. Reference "B" refers to the radial distance between the axis L42 and the point of contact of the ball 165 with the outer ball track 147 in the outer joint part 142 at the maximum joint articulation angle. The maximum articulation angle of the joint is determined by the shaft stopping against the outer joint part 142 and by the end of the effective guidance of the ball 165 in the outer ball track 147 in the outer joint part 142. In the joint shown here with a round cross-sectional track shape, the point of contact is located in the track base. In joints with other cross-sectional track shapes, it is possible for pairs of contact points to be positioned opposite one another in the track flanks. The two different pairs of tracks can be arranged so as to alternate on the circumference or they can be alternately distributed in pairs.

Figure 4:
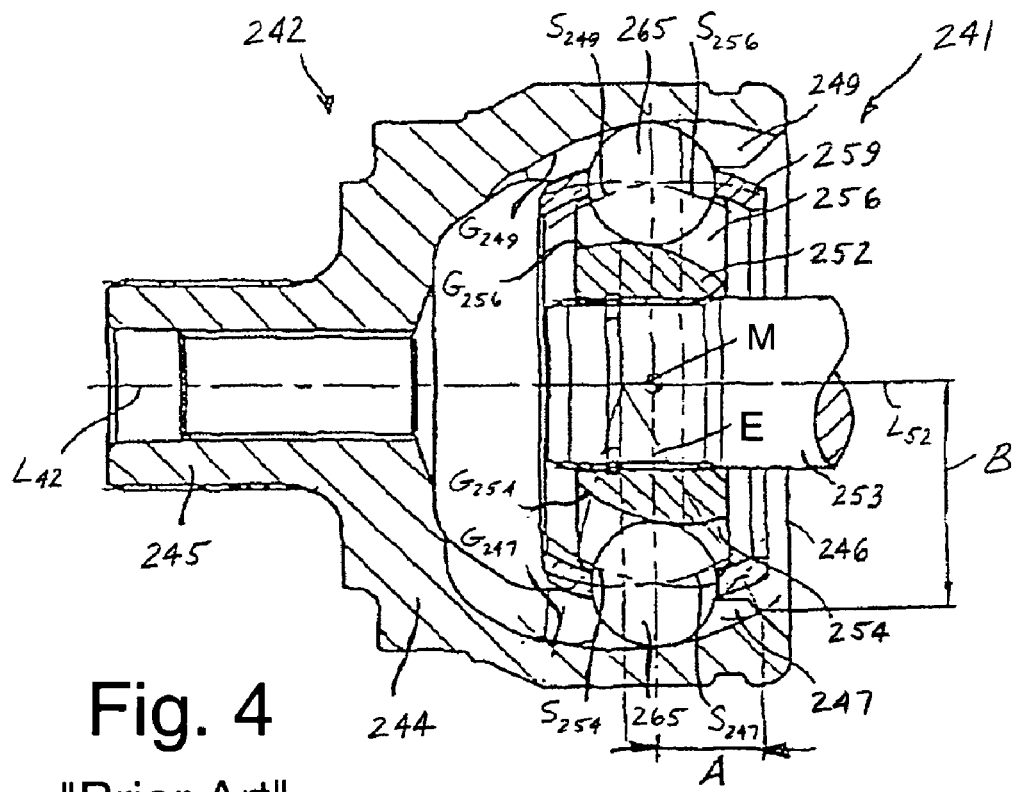
FIG. 4 shows a second example of a joint according to the state of the art wherein some of the pairs of tracks diverge from the joint aperture to the attaching part.

FIG. 4 shows a joint 241 whose outer joint part 242 has of an annular part 243 and an attaching part 244. The attaching part 244 has an integrally attached journal 245. The annular part 243 and the attaching part 244 are produced so as to be integral with one another. In the outer joint part 242 there is arranged an inner joint part 252. Between the outer joint part 242 and the inner joint part 252, there is positioned a ball cage 259 with circumferentially distributed cage windows 262 in which there are received balls 265. The outer joint part and inner joint part form first pairs of tracks consisting of outer ball tracks 247 and inner ball tracks 254 whose track base lines G247, G254 diverge from the joint aperture 246 to the attaching part 244, as well as second pairs of tracks consisting of outer ball tracks 249 and inner ball tracks 256 whose track base lines G249, G256 diverge from the attaching part 244 to the joint aperture 246. The center lines S247, S254, S249, S256, of the ball tracks each consist entirely of circular arches whose centers are positioned on the axes L42, L52 so as to be offset in opposite directions from the joint center M. Reference "A" refers to the axial distance between the joint center M and the point of contact of the ball 265 with the outer ball track 247 in the outer joint part 242 at the maximum joint articulation angle. Reference "B" refers to the radial distance between the axis L42 and the point of contact of the ball 265 with the outer ball track 247 in the outer joint part 242 at the maximum joint articulation angle. The maximum articulation angle of the joint is determined by the shaft stopping against the outer joint part 242 and by the end of the effective guidance of the ball 265 in the outer ball track 247 in the outer joint part 242. In the joint shown here with a round cross-sectional track shape, the point of contact is located in the track base. In joints with other cross-sectional track shapes, it is possible for pairs of contact points to be positioned opposite one another in the track flanks. The two different pairs of tracks can be arranged so as to alternate on the circumference or they can be alternately distributed in pairs.

Figure 5:
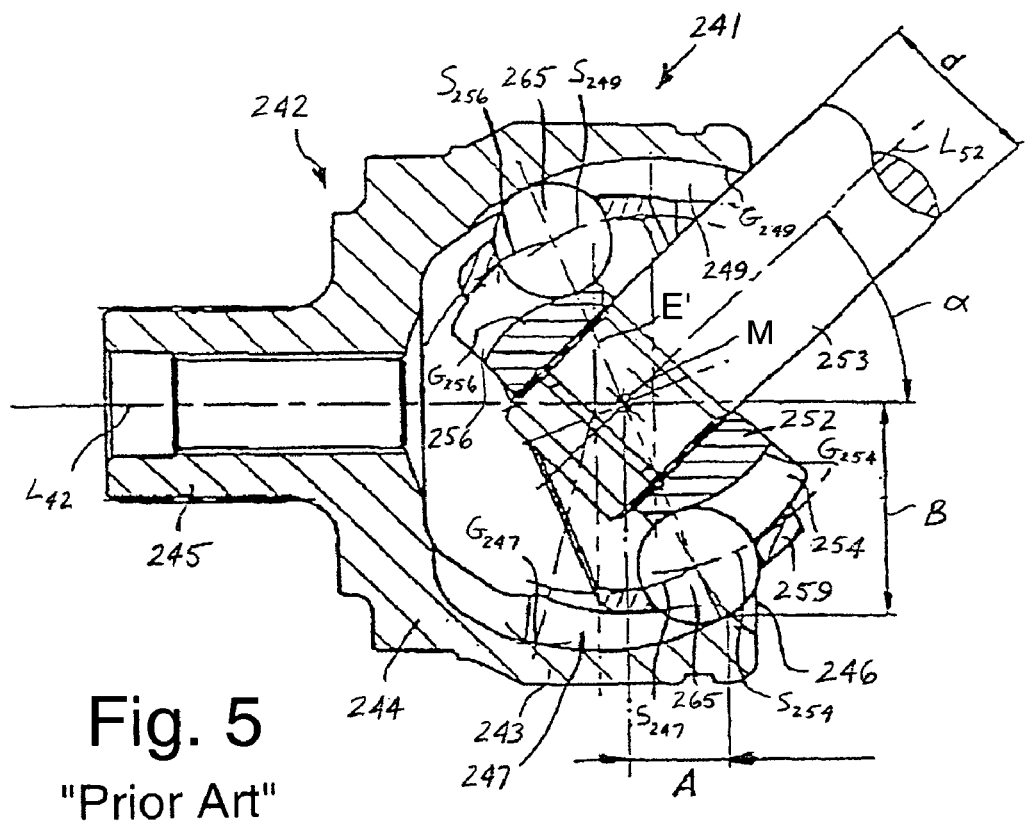
FIG. 5 shows the joint according to FIG. 4 in an articulated condition.

FIG. 5 shows the joint according to FIG. 4 in accordance with the state of the art in an articulated condition. The axis L52 of the inner joint part 252, together with the axis L42 of the outer joint part 242, forms an angle α which is delimited in that the shaft 253 stops against the aperture 256 of the outer joint part. The point of intersection of the axes L42, L52 is positioned in the joint center M. The center lines S247, S254, S249, S256, of all outer and inner ball tracks 247, 254, 249, 256 are formed by circular arches whose centers are arranged on the respective axis L42, L52 of the respective joint part 242, 252 so as to be offset in opposite directions from the central plane of the respective joint part 242, 252. The track center lines, in turn, form pairs of points of intersection which constitute the geometric locations for the centers of the balls 265. Reference "A" refers to the axial distance between the joint center M and the point of contact of the ball 265 with the outer ball track 247 in the outer joint part 242 at the maximum joint articulation angle. Reference "B" refers to the radial distance between the axis L42 and said point of contact of the ball 265 with the outer ball track 247 in the outer joint part 242 at the maximum joint articulation angle. The maximum articulation angle of the joint is determined by the shaft stopping against the outer joint part 242 and by the end of the effective guidance of the ball 265 in the outer ball track 247 in the outer joint part 242. These dimensions, together with the diameter d of the shaft 253, result in the maximum articulation angle of α=45°. In the joint shown here with a round cross-sectional track shape, the point of contact is located in the track base. In joints with other cross-sectional track shapes, it is possible for pairs of contact points to be positioned opposite one another in the track flanks.

Figure 6:
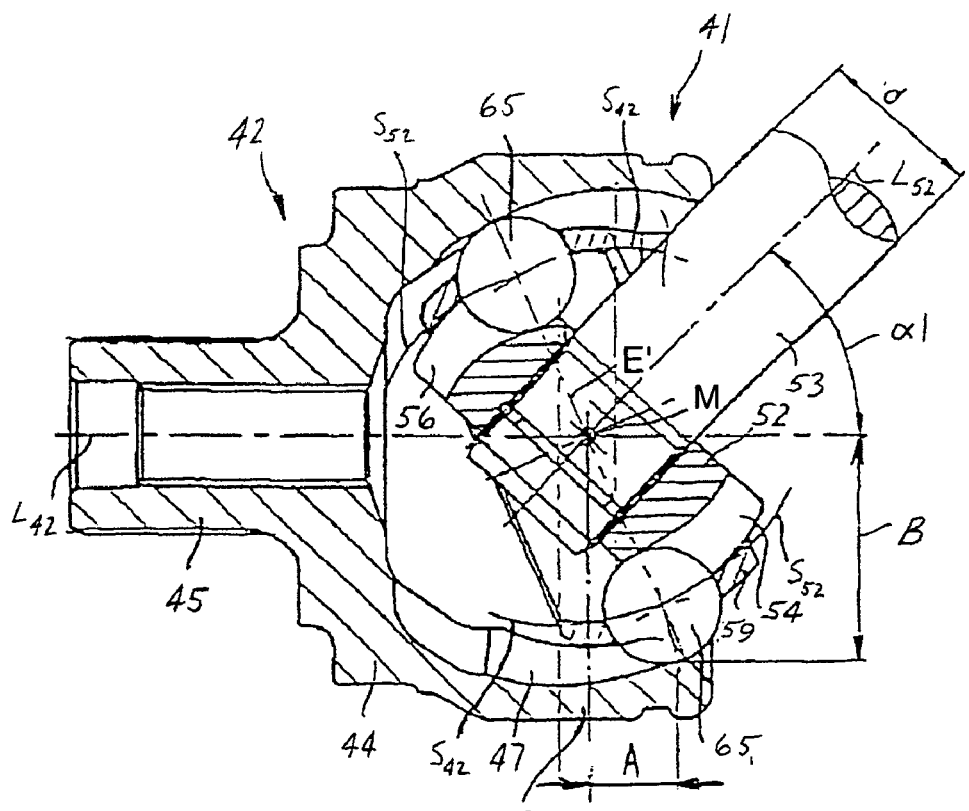
FIG. 6 shows a joint similar to that of FIG. 4 in accordance with an embodiment of the invention in an articulated condition.

FIG. 6 shows a joint similar to that shown in FIG. 4 in accordance with an embodiment of the invention in an articulated condition. The axis L52 of the inner joint part 52, together with the axis L42 of the outer joint part 42, forms an angle α1 which is delimited in that the shaft 53 stops against the aperture 46 of the outer joint part 42. The point of intersection of the axes L42, L52 is positioned in the joint center M. The center lines S42, S52, of the outer and inner ball tracks 49, 56 are formed entirely by circular arches with adjoining tangents, whose centers are arranged on the respective axis of the respective joint part 42, 52 so as to be offset in opposite directions relative to the joint center M. The track center lines, in turn, form pairs of points of intersection with one another, which constitute the geometric locations for the centers of the balls 65. Reference "A" refers to the axial distance between the joint center M and the point of contact of the ball 65 with the outer ball track 47 in the outer joint part 42 at the maximum joint articulation angle. Reference "B" refers to the radial distance between the axis L42 and said point of contact of the ball 65 with the outer ball track 47 in the outer joint part 42 at the maximum joint articulation angle. The maximum articulation angle of the joint is determined by the shaft stopping against the outer joint part 42 and by the end of the effective guidance of the ball 65 in the outer ball track 47 in the outer joint part 42. These dimensions, together with the diameter d of the shaft 53, result in the maximum articulation angle of α1=47°. In the joint shown here with a round cross-sectional track shape, the point of contact is located in the track base. In joints with other cross-sectional track shapes, it is possible for pairs of contact points to be positioned opposite one another in the track flanks.

When comparing the state of the art joint of FIG. 5 with the embodiment according to FIG. 6 it can be seen that the angle α1 is greater than the angle α. This has been achieved by the change in the track center lines, which is accompanied by an increase in the dimension B and a decrease in the dimension A.

FIGS. 7-12 each show two embodiments designated as "A" and "B," respectively. The reference numerals used generally correspond to like parts with subscripts identifying the associated Figure. The corresponding "A" and "B" figures will otherwise be described jointly. In general, FIGS. 7A, 8A, 9A, 10A, 11A and 12A show an embodiment of an inventive joint with all pairs of tracks diverging from the joint aperture to the attaching part. Similarly, FIGS. 7B, 8B, 9B, 10B, 11B and 12B show an embodiment of an inventive joint with only some of the pairs of tracks diverging from the joint aperture to the attaching part. Track details are also shown for each of the "A" and "B" embodiments as Figures "C" and "D", respectively. In each detail of FIGS. 7 to 12, the outer ball track 17, 47 shown opens towards the attaching part, and the ball cage has been omitted for purposes of clarity. In all variants, the opening dimension B has been increased relative to the state of the art, whereas the axial dimension A has been reduced relative to the state of the art. The half-section views show the fixed outer joint part 12, 42 with a horizontal axis and the inner joint part 22, 52 which, relative thereto, has been pivoted by the angle α. Furthermore, the half-section figures show the shaft 23, 53 in a stopping position at the joint aperture 16, 46, pivoted to the angle α, as well as a ball 35, 65 which, together with the inner joint part, has been pivoted by the angle α/2. In the detailed views, the shaft 23, 53 having a diameter d and ball 35, 65 drawn inside one another when, in fact, they are positioned on diametrically opposite sides of the axis L12, L42.

In FIGS. 7A, 8A, 9A, 10A, 11A and 12A, the outer joint part 12 has the outer ball tracks 17 comprising center lines S12 and track base lines G12 which extend at equal distances therefrom. The outer ball tracks 17 are curved and extend in planes through the first longitudinal axis L12. The inner joint part 22 has inner ball tracks 24 comprise center lines S22 and track base lines G22 which extend at equal distances therefrom. The inner ball tracks 24 are curved and extend in planes through the second longitudinal axis L22. The outer ball tracks 17 and the inner ball tracks 24 form pairs of tracks with one another which each receive a torque transmitting ball 35. The centers of the balls 35 are held by the cage 29 in a central plane E when the joint is in an aligned condition, and in an angle-bisecting plane E' when the joint is in an articulated condition. When the joint is in an aligned condition, the center lines S12, S22 of the pairs of tracks are mirror-symmetrical relative to one another with reference to the central plane E; and when the joint is articulated, they are mirror-symmetrical relative to one another with reference to the angle-bisecting plane E'. The track base lines G12, G22 of the pairs of tracks diverge from one another running from the aperture 16 to the attaching part 15.

In FIGS. 7B, 8B, 9B, 10B, 11B and 12B, the outer joint part 42 has outer ball tracks 47, 49 comprise center lines S42 and track base lines G42 which extend at equal distances therefrom. The outer ball tracks 47, 49 are curved and extend in planes through the first longitudinal axis L42. The inner joint part 52 has inner ball tracks 54, 56 comprise center lines S52 and track base lines G52 which extend at equal distances therefrom. The inner ball tracks 54, 56 are curved and extend in planes through the second longitudinal axis L52. The outer ball tracks 47, 49 and the inner ball tracks 54, 56 form pairs of tracks with one another which each receive a torque transmitting ball 65. The centers of the balls 65 are held by the cage 59 in a central plane E when the joint is in an aligned condition, and in an angle-bisecting plane E' when the joint is in an articulated condition. When the joint is in an aligned condition, the center lines S42, S52 of the pairs of tracks are mirror-symmetrical relative to one another with reference to the central plane E; and when the joint is articulated, they are mirror-symmetrical relative to one another with reference to the angle-bisecting plane E'. The track base lines of the pairs of tracks move away from one another in one direction: the track base lines G42', G52' of first pairs of tracks 49, 56 diverge from one another running from the attaching part 45 to the aperture 46; the track base lines G42, G52 of second pairs of tracks 47, 54 diverge from one another running from the aperture 46 to the attaching part 45. The track base lines G42 of the outer ball tracks 47 of said second pairs of tracks, at the attaching part end 45, comprise a first radius ra whose center Z1 is positioned on the first longitudinal axis L42 and offset by a first offset OFF from the central plane E of the outer joint part towards the attaching part 45, and said track base lines G42 diverge from a circle with said first radius ra outwardly towards the aperture end 46. The track base lines G52 of the inner ball tracks 54 of said second pairs of tracks, at the aperture end 46, comprise a second radius ri whose center Z2 is positioned on the second longitudinal axis L52 and offset by a second offset OFF2 from the central plane E of the inner joint part towards the aperture 46, and said track base lines G52 diverge from a circle with said second radius ri outwardly towards the attaching part end 45.

In all Figures, M refers to the joint center and Z1 and Z2 refer to centers of the generating radii of curvature of the tracks, which centers are positioned on the axes L12, L22, L42, L52, so as to be offset from the joint center M in opposite directions. The position of the centers Z1 and Z2 in the direction of the axes is indicated by an axial offset OFF from the central plane E12, E42 of the outer joint part and by an axial offset OFF2 from the central plane E22, E52 of the inner joint part. The angle-bisecting plane has been given the reference symbol E'.

Hereafter, the outer ball tracks 17, 47 are described as extending from the attaching part to the aperture, whereas the inner ball tracks are described as extending from the aperture to the attaching part.

Figure 7A:
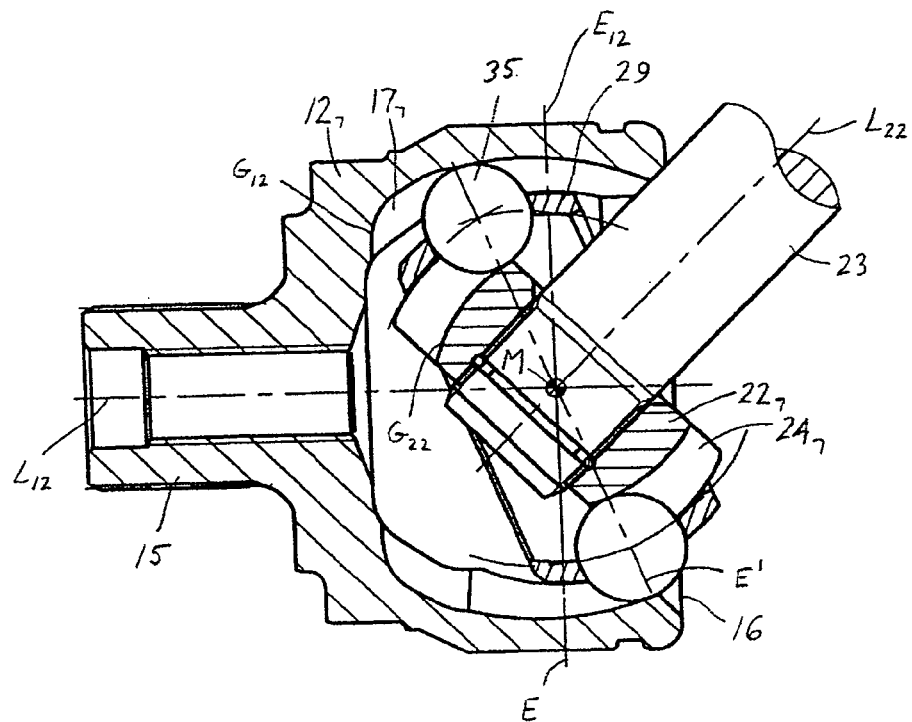
FIG. 7A shows an inventive joint in a half-section in a second embodiment wherein all pairs of tracks diverge from the joint aperture to the attaching part.
Figure 7C:
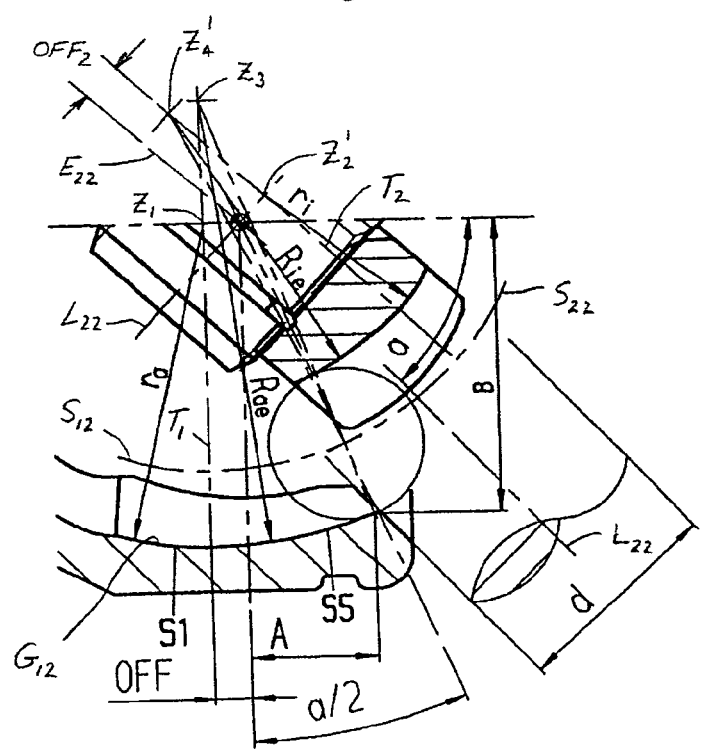
FIG. 7C shows the track detail for lower track pair of FIG. 7A.
Figure 7B:
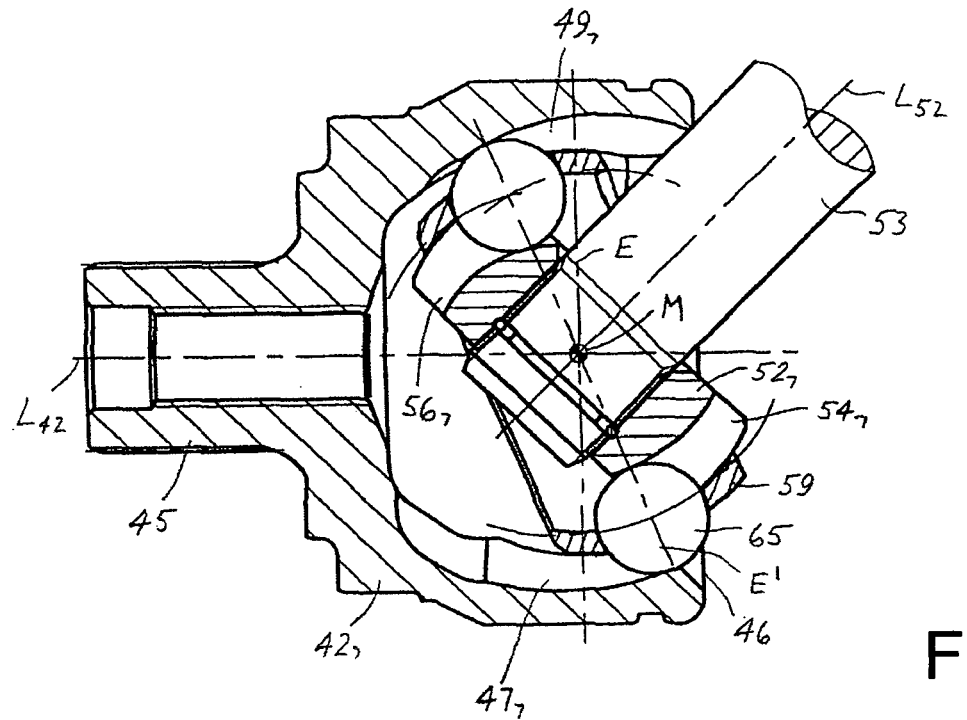
FIG. 7B shows an inventive joint in a half-section in a second embodiment wherein some of the pairs of tracks diverge from the joint aperture to the attaching part.
Figure 7D:
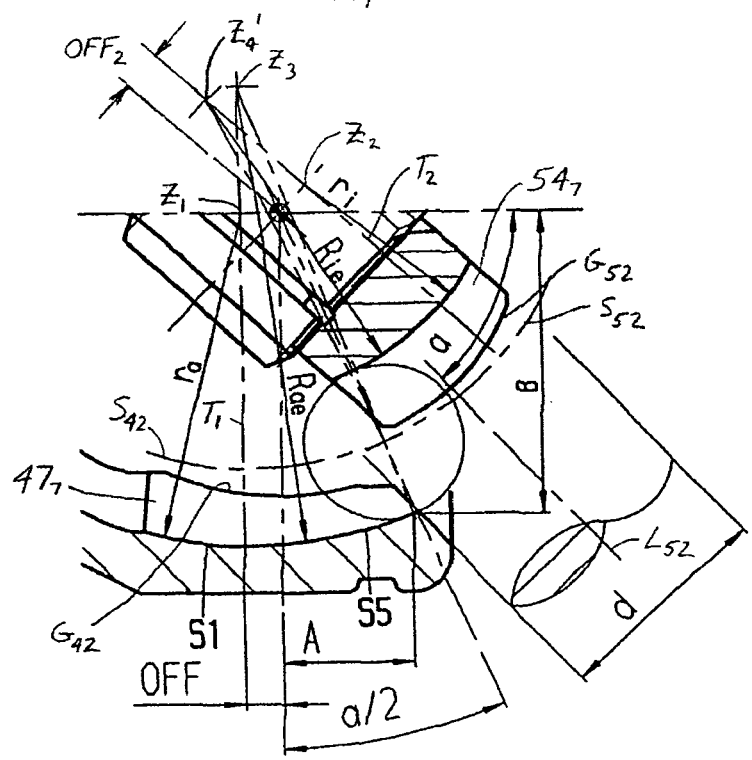
FIG. 7D shows the track detail for the lower track pair of FIG. 7B.
Figure 7E:
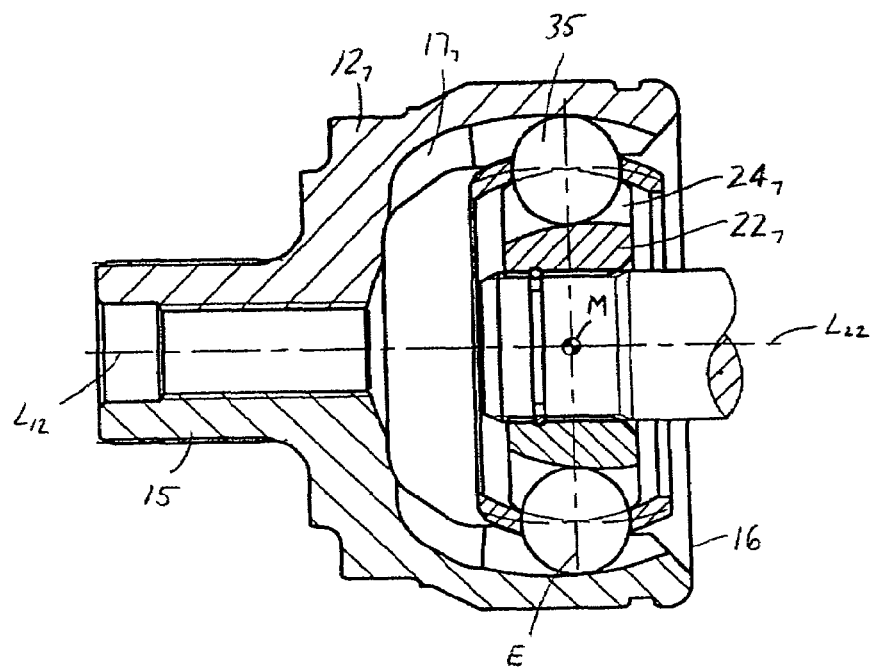
FIG. 7E shows the joint of FIG. 7A in an aligned condition.
Figure 7F:
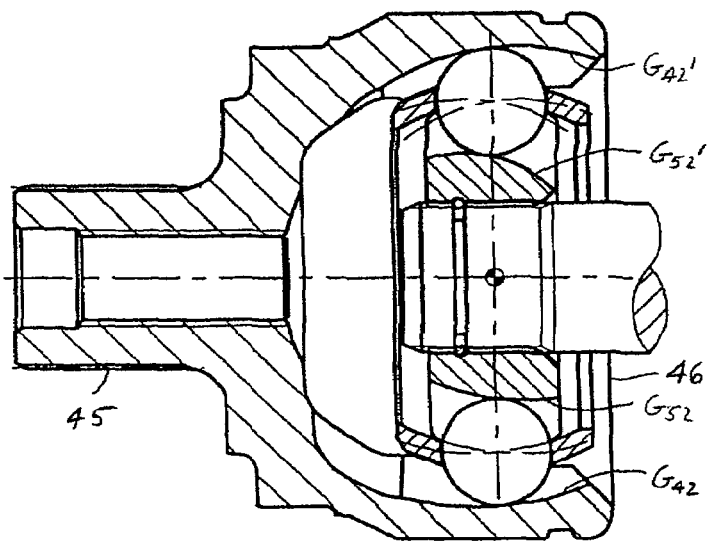
FIG. 7F shows the joint of FIG. 7B in an aligned condition.

In FIGS. 7A and 7B, the outer ball track $17_7$, $47_7$ in the outer joint part $22_7$, $47_7$ includes a first portion $S_1$ and a second portion $S_5$, with the further details referring to the track base $G_{12}$, $G_{42}$. The portion $S_1$, with the radius $r_a$, is formed around the center $Z_1$ and extends as far as the radial plane $T_1$ through the centers $Z_1$ and $Z_3$. The portion $S_5$, with the greater radius $R_{ae}$, is formed around an eccentric center $Z_3$ and extends from the radial plane $T_1$ to the aperture $16_7$, $46_7$ of the outer joint part. The inner ball track $24_7$, $54_7$ on the inner joint part comprises corresponding track portions, with the further details also referring to the track base $G_{22}$, $G_{52}$. A first portion, with the radius $r_i$, is formed around the pivoted center $Z_2'$ and extends as far as the radial plane $T_2$ through the centers $Z_2'$ and $Z_4'$. A second portion, with the greater radius $R_{ie}$ is formed around an eccentric center $Z_4'$ and extends from the radial plane $T_2$ to the inner end face of the inner joint part.

Figure 8A:
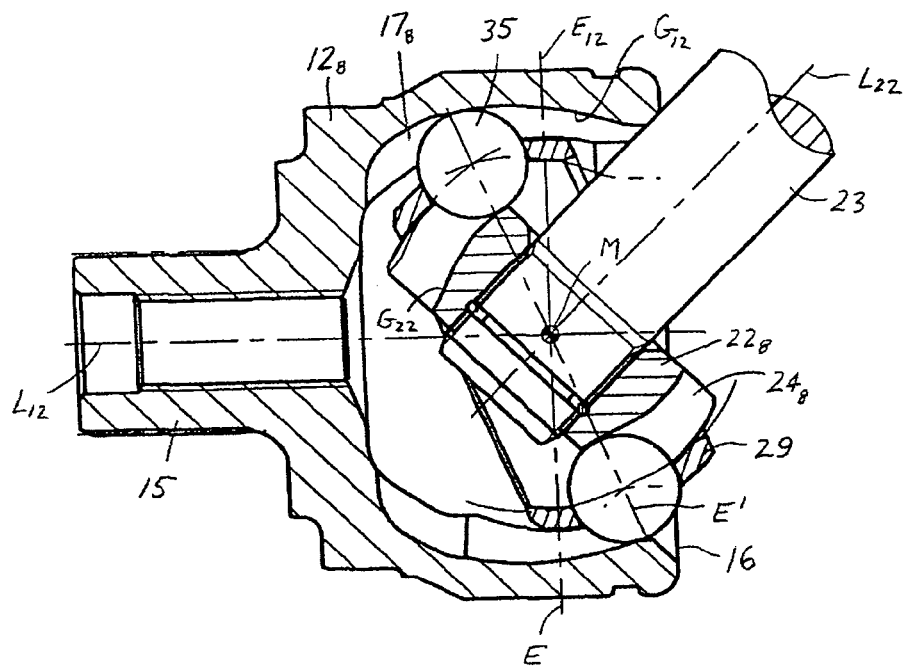
FIG. 8A shows an inventive joint in a half-section in a third embodiment wherein all pairs of tracks diverge from the joint aperture to the attaching part.
Figure 8C:
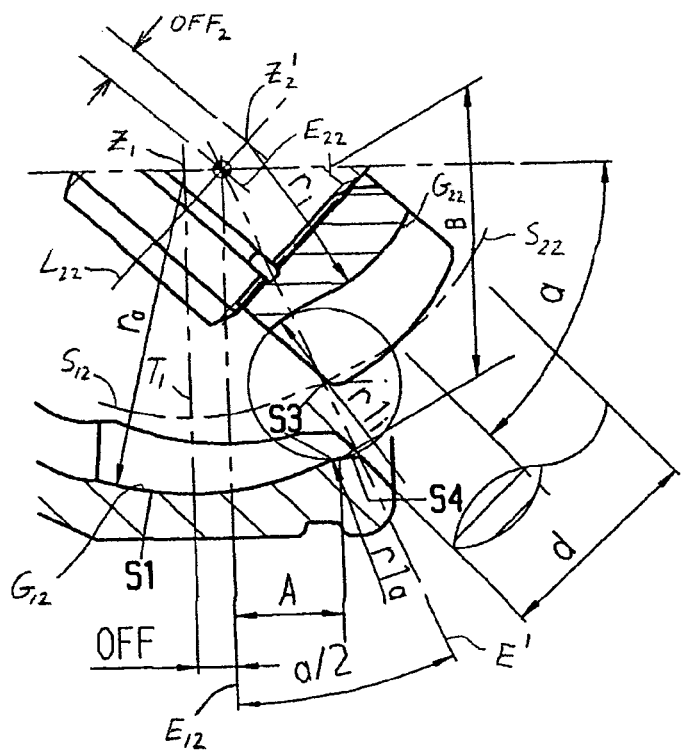
FIG. 8C shows the track detail for lower track pair of FIG. 8A.
Figure 8B:
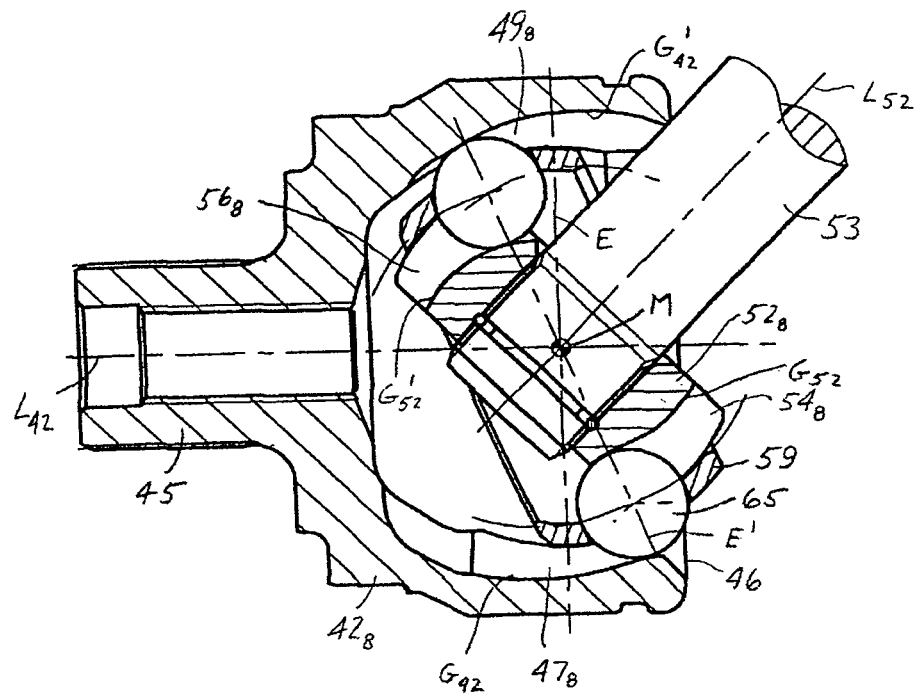
FIG. 8B shows an inventive joint in a half-section in a third embodiment wherein some of the pairs of tracks diverge from the joint aperture to the attaching part.
Figure 8D:
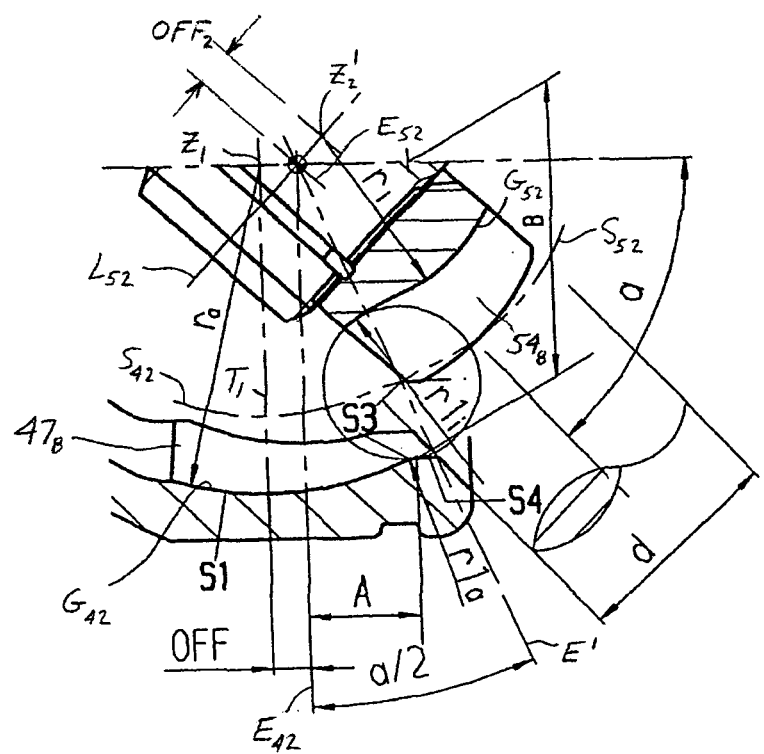
FIG. 8D shows the track detail for the lower track pair of FIG. 8B.

In FIGS. 8A and 8B, the outer ball track $17_8$, $47_8$ is formed of three portions $S_1$, $S_3$ and $S_4$. The portion $S_1$ is defined by the radius $r_a$ around the center $Z_1$ and extends beyond the radial plane $T_1$ through the center $Z_1$ as far as the tangentially following portion $S_3$. The portion $S_3$ is defined by a counter radius with the radius $r_{1a}$ and extends as far as the portion $S_4$. The portion $S_4$ is a tangential straight line adjoining the radius $r_{1a}$. The track base lines of the outer ball tracks diverge from a circle with a radius $r_a$ outwardly towards the aperture end. The inner ball track $24_8$, $54_8$ on the inner joint part comprises corresponding track portions. A first portion with the radius $r_i$ is formed around the pivoted center $Z_2'$. Said first portion is tangentially followed by a second portion with a counter radius $r_{1i}$ which changes into a tangentially adjoining straight line (not described in further detail). The track base lines of the inner ball tracks diverge from a circle with a radius $r_i$ towards the attaching part end.

Figure 9A:
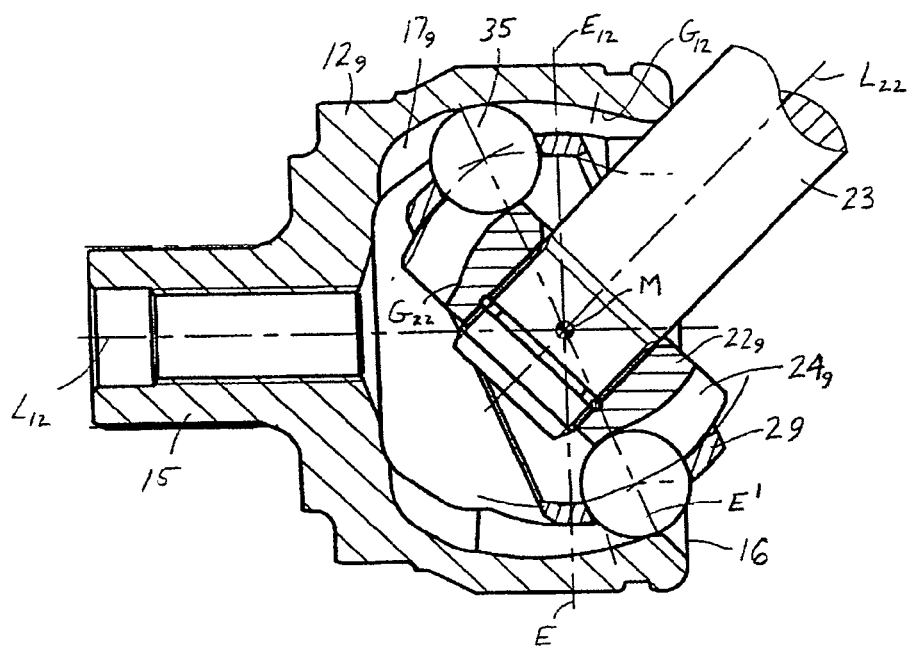
FIG. 9A shows an inventive joint in a half-section in a fourth embodiment wherein all pairs of tracks diverge from the joint aperture to the attaching part.
Figure 9C:
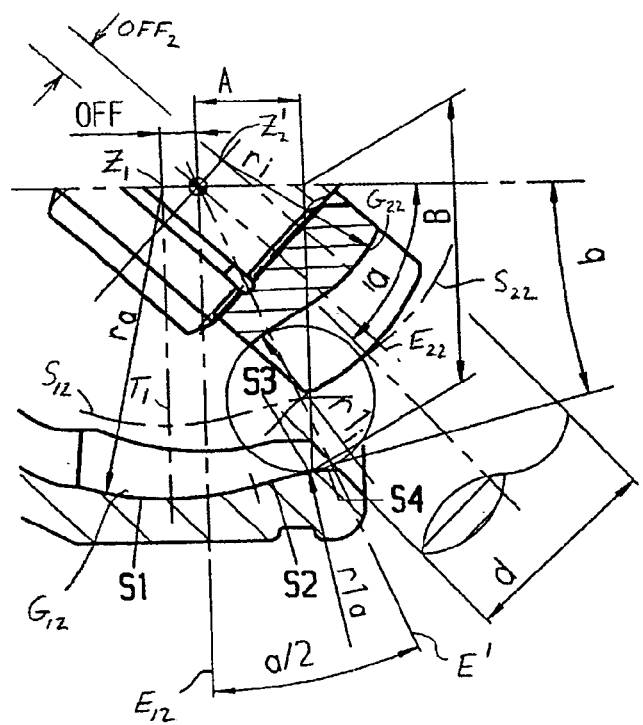
FIG. 9C shows the track detail for lower track pair of FIG. 9A.
Figure 9B:
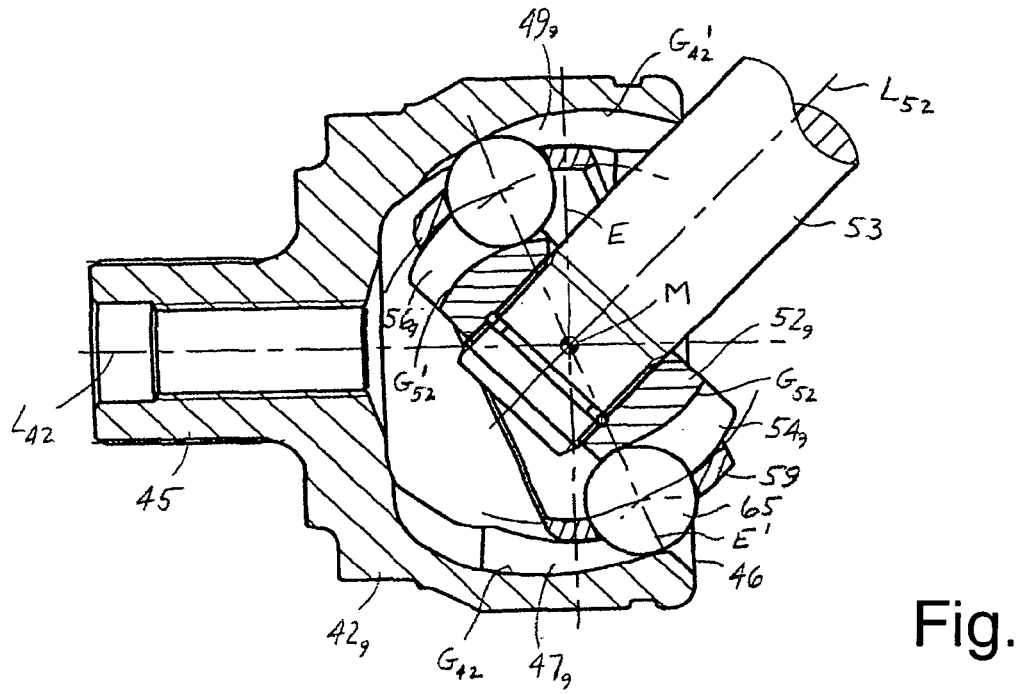
FIG. 9B shows an inventive joint in a half-section in a fourth embodiment wherein some of the pairs of tracks diverge from the joint aperture to the attaching part.
Figure 9D:
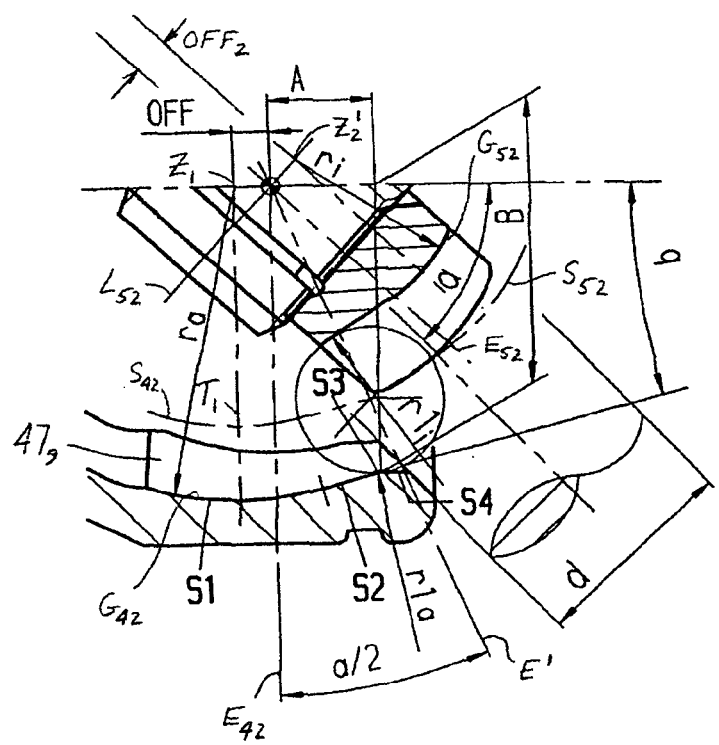
FIG. 9D shows the track detail for the lower track pair of FIG. 9B.

In FIGS. 9A and 9B, the outer ball track $17_9$, $47_9$ is formed of three portions $S_1$, $S_3$ and $S_4$. The portion $S_1$ is defined by the radius $r_a$ around the center $Z_1$ and extends beyond the radial plane $T_1$ through $Z_1$ as far as the portion $S_2$. $S_2$ is a tangential straight line which follows the portion $S_1$ and which, together with the axis $L_{42}$, encloses an angle b and extends as far as the portion $S_3$. $S_3$ is a counter radius with the radius $r_{1a}$ tangentially following $S_2$ and extends as far as the portion $S_4$. $S_4$ is a straight line tangentially adjoining $S_3$. The inner ball track $24_9$, $54_9$ on the inner joint part comprises corresponding track portions. A first portion in form of a radius $r_i$ is formed around the pivoted center $Z_2'$. Said first portion is followed by a straight line (not described in greater detail) in the form of a second portion which, in turn, is followed by a third portion in the form of a tangentially adjoining counter radius $r_{1i}$ and by a fourth portion (not described in greater detail) in the form of a straight line.

Figure 10A:
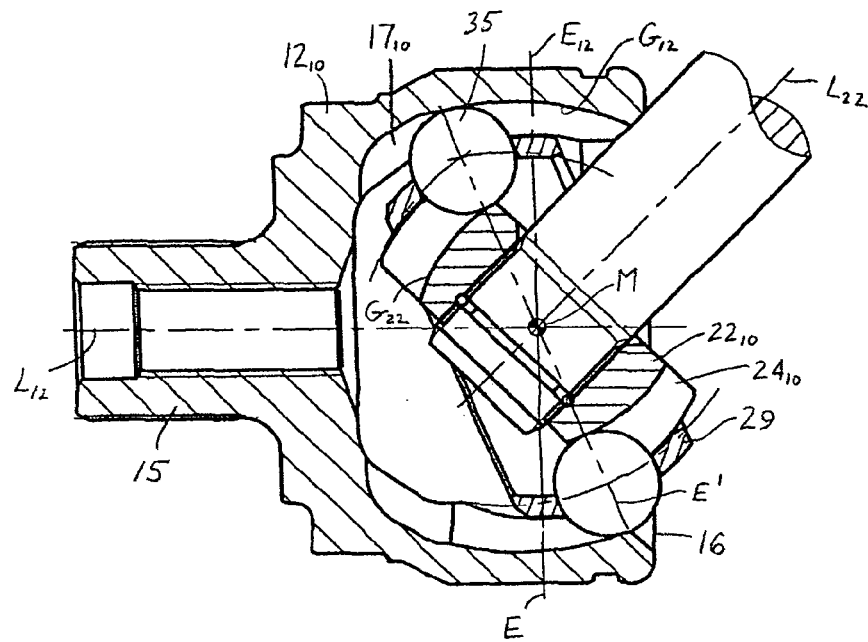
FIG. 10A shows an inventive joint in a half-section in a fifth embodiment wherein all pairs of tracks diverge from the joint aperture to the attaching part.
Figure 10C:
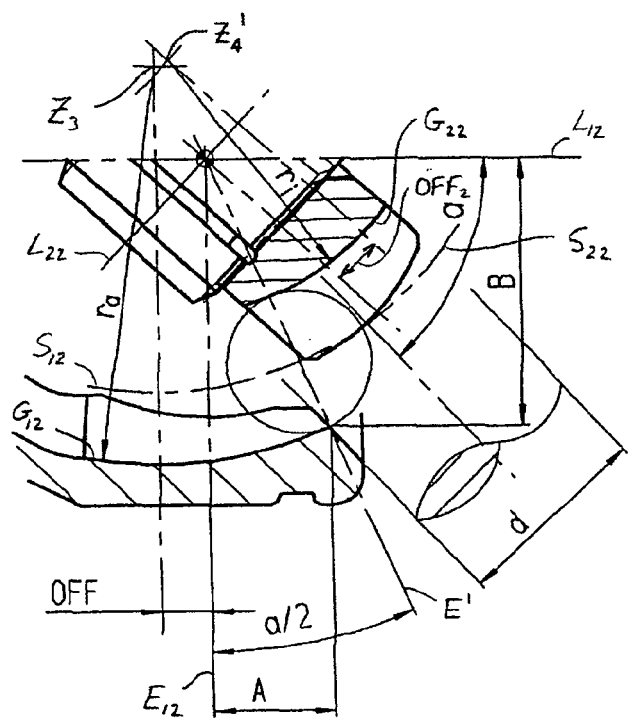
FIG. 10C shows the track detail for lower track pair of FIG. 10A.
Figure 10B:
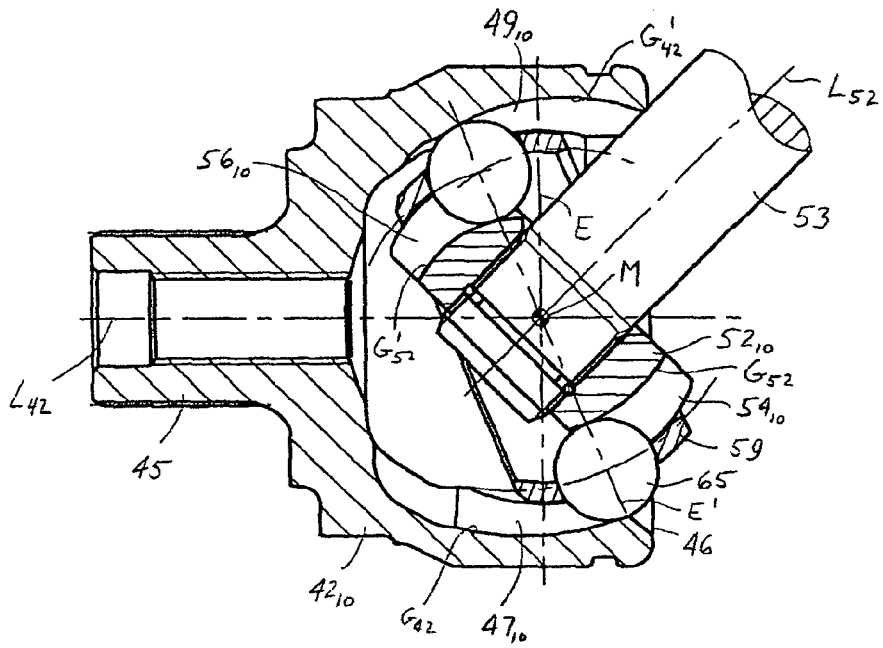
FIG. 10B shows an inventive joint in a half-section in a fifth embodiment wherein some of the pairs of tracks diverge from the joint aperture to the attaching part.
Figure 10D:
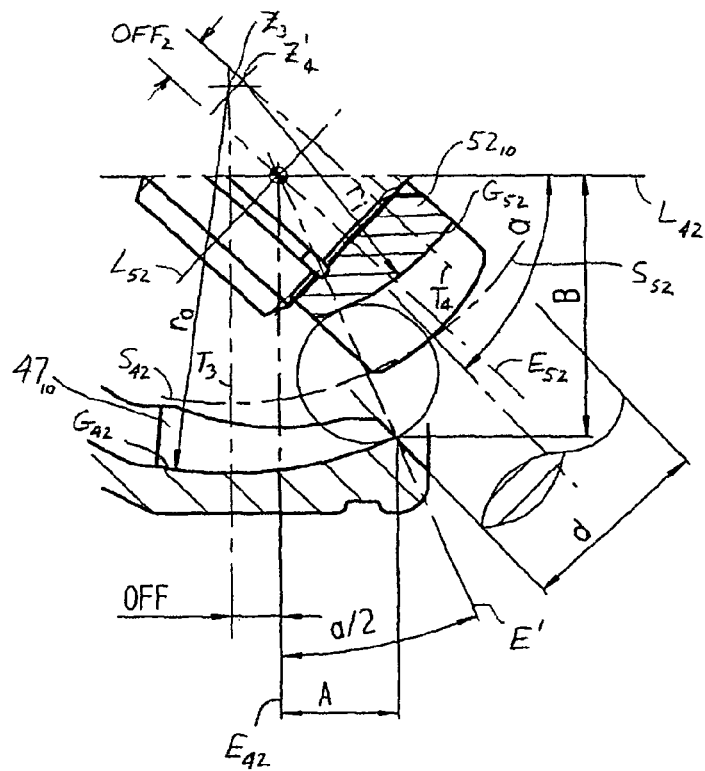
FIG. 10D shows the track detail for the lower track pair of FIG. 10B.

In FIGS. 10A and 10B, the outer ball track $17_{10}$, $47_{10}$ is formed by a uniform portion $S_1$ which is defined by a radius $r_a$ around an eccentric center $Z_3$ which, on the axis $L_{42}$, $L_{12}$ is at a distance OFF from the joint center M. The inner ball track $24_{10}$, $54_{10}$ is formed accordingly by a uniform portion with the radius $r_i$ around the pivoted eccentric center $Z_4'$ which, on the axis $L_{22}$, $L_{52}$, is at a distance $OFF_2$ from the joint center.

Figure 11A:
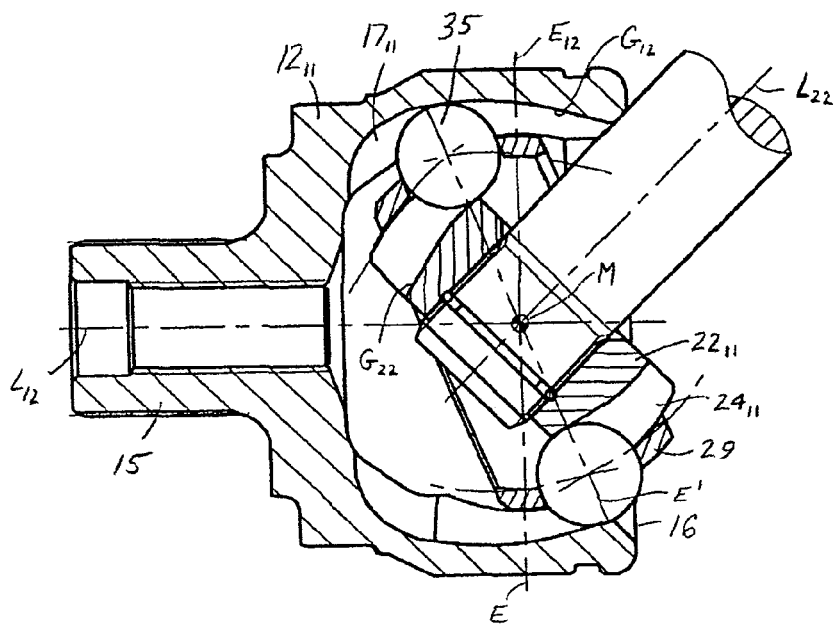
FIG. 11A shows an inventive joint in a half-section in a sixth embodiment wherein all pairs of tracks diverge from the joint aperture to the attaching part.
Figure 11C:
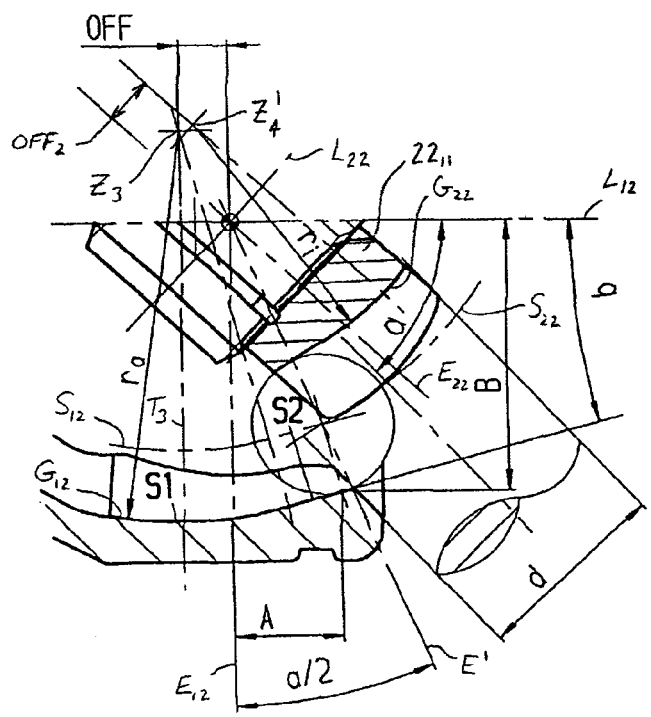
FIG. 11C shows the track detail for lower track pair of FIG. 11A.
Figure 11B:
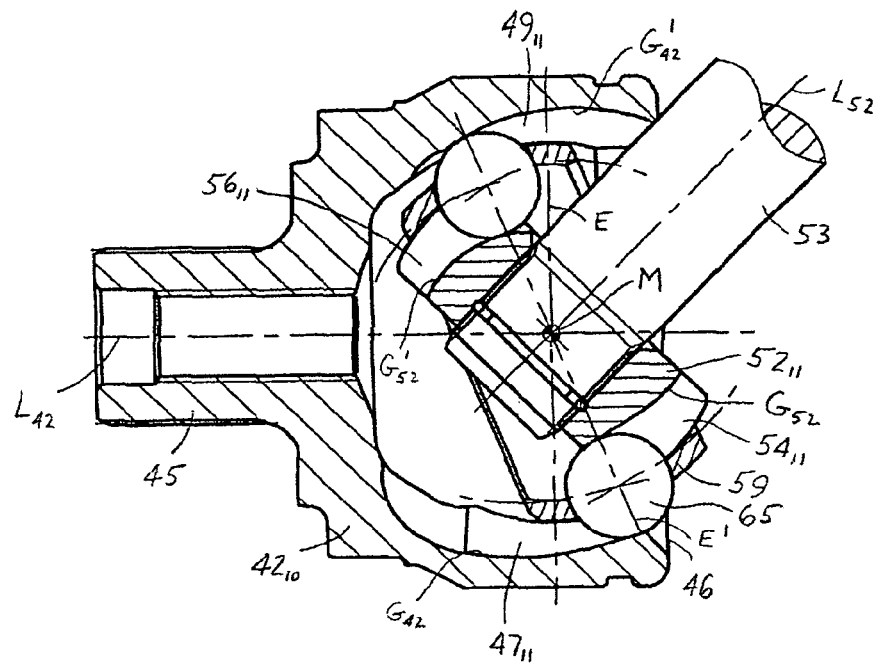
FIG. 11B shows an inventive joint in a half-section in a sixth embodiment wherein some of the pairs of tracks diverge from the joint aperture to the attaching part.
Figure 11D:
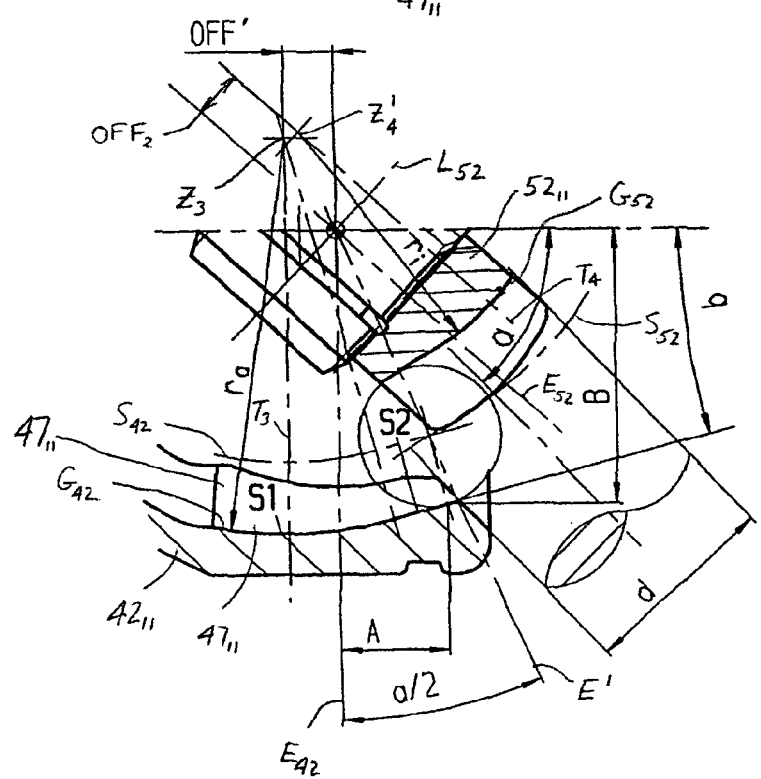
FIG. 11D shows the track detail for the lower track pair of FIG. 11B.

In FIGS. 11A and 11B, the outer ball track $17_{11}$, $47_{11}$ is formed of two portions $S_1$, $S_2$. The portion $S_1$ is defined by a radius $r_a$ around a center $Z_3$ which corresponds to that shown in FIG. 10 and extends beyond the radial plane $T_3$ through the center $Z_3$ as far as the portion $S_2$. The portion $S_2$ is defined by a straight line tangentially following the portion $S_1$, extending at the angle b relative to the center line $L_{12}$, $L_{42}$. The inner ball track $24_{11}$, $54_{11}$ is formed accordingly by a first portion with the radius $r_i$ around the pivoted center $Z_4'$ and a tangentially following straight line (not described in further detail).

Figure 12A:
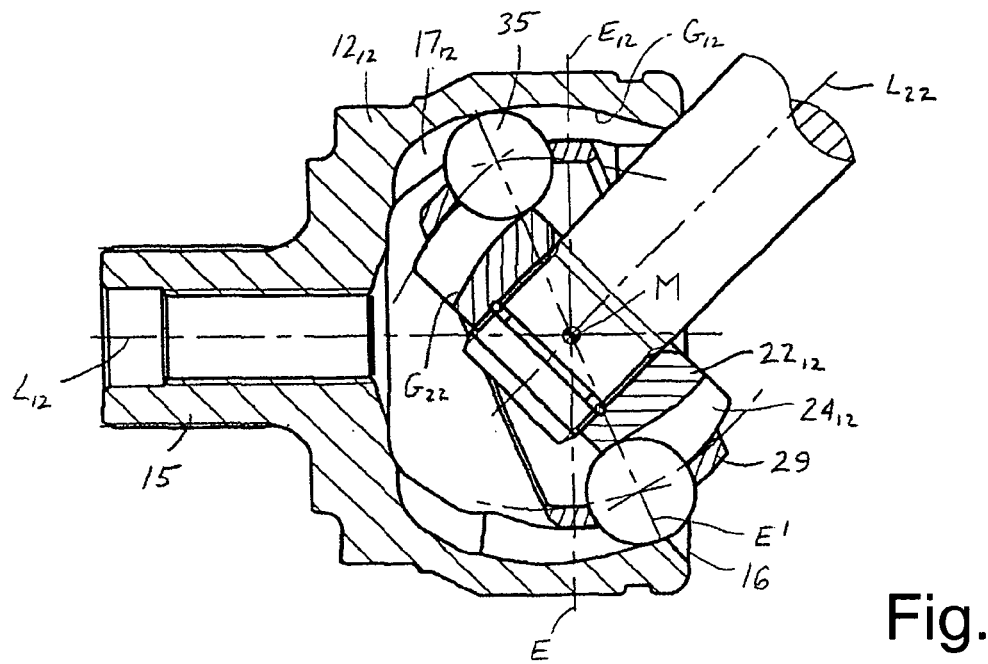
FIG. 12A shows an inventive joint in a half-section in a seventh embodiment wherein all pairs of tracks diverge from the joint aperture to the attaching part.
Figure 12C:
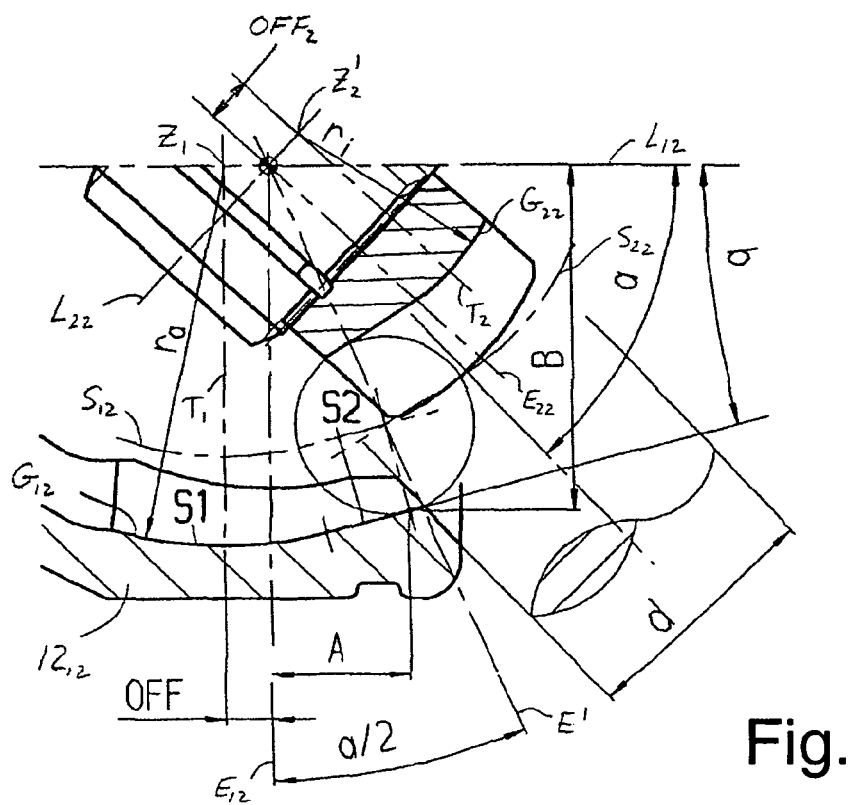
FIG. 12C shows the track detail for lower track pair of FIG. 12A.
Figure 12B:
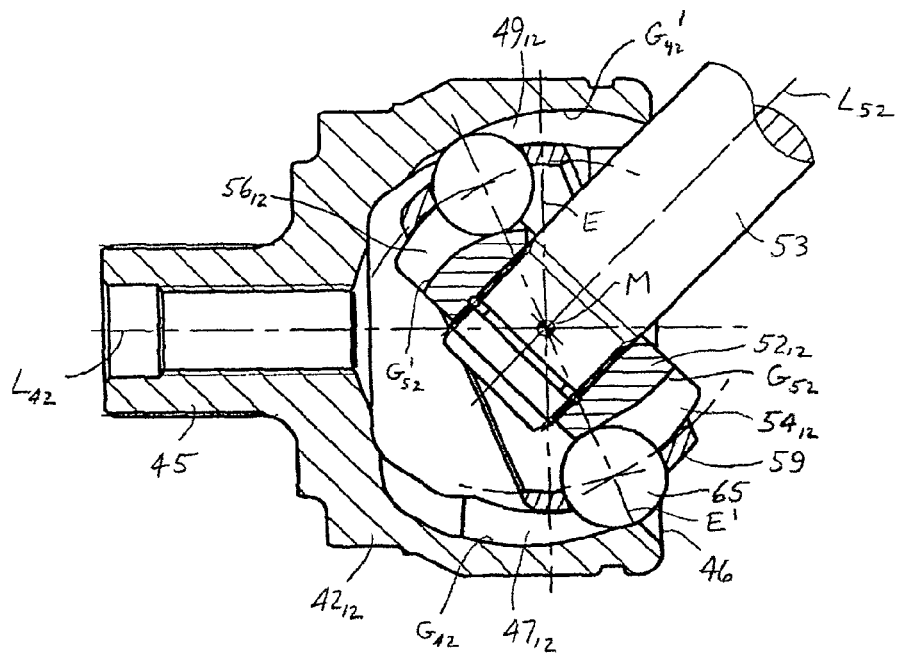
FIG. 12B shows an inventive joint in a half-section in a seventh embodiment wherein some of the pairs of tracks diverge from the joint aperture to the attaching part.
Figure 12D:
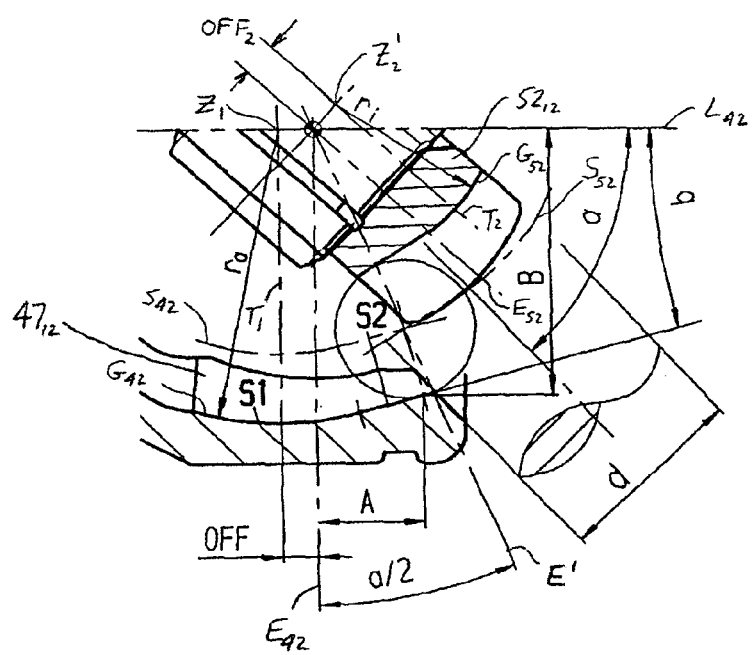
FIG. 12D shows the track detail for the lower track pair of FIG. 12B.

In FIGS. 12A and 12B, the outer ball track $17_{12}$, $47_{12}$ is formed of two portions $S_1$, $S_2$. The portion $S_1$ is defined by a radius $r_a$ around a center $Z_1$, which corresponds to that shown in FIG. 9 and extends beyond the radial plane $T_1$ through the center $Z_1$ as far as the portion $S_2$. The portion $S_2$ is defined by a straight line tangentially following the portion $S_1$, extending at the angle b relative to the center line $L_{12}$, $L_{42}$. The inner ball track $24_{12}$, $54_{12}$ is formed accordingly by a first portion in the form of a radius around the pivoted center $Z_2'$ with the radius $r_l$, and a tangentially following straight line (not described in further detail).

As explained above, the points of contact of the ball with the outer track in track cross-sections other than round can also be positioned at a distance from the track base opposite one another in the track flanks.

The invention claimed is:

1. A constant velocity fixed joint comprising:
an outer joint part comprising a first longitudinal axis, an attaching part and an axially opposed aperture, and outer ball tracks;
an inner joint part comprising a second longitudinal axis and inner ball tracks; and
a ball cage positioned between the outer joint part and the inner joint part and comprising circumferentially distributed cage windows which each receive a torque transmitting ball;
the outer ball tracks comprise center lines and track base lines which extend at equal distances therefrom, which are curved and extend in planes through the first longitudinal axis;
the inner ball tracks comprise center lines and track base lines which extend at equal distances therefrom, which are curved and extend in planes through the second longitudinal axis;
the outer ball tracks and the inner ball tracks form pairs of tracks with one another which each receive one of the torque transmitting balls;
the centers of the balls are held by the cage in a central plane when the joint is in an aligned condition and in an angle-bisecting plane when the joint is in an articulated condition;
when the joint is in an aligned condition, the center lines of the pairs of tracks are mirror-symmetrical relative to one another with reference to the central plane and when the joint is articulated, they are mirror-symmetrical relative to one another with reference to the angle-bisecting plane;
the track base lines of the pairs of tracks move away from one another in one direction with one part of the pairs of tracks forming first pairs of tracks and another part of the pairs of tracks forming second pairs of tracks, the track base lines of said first pairs of tracks diverge from one another running from the attaching part to the aperture, and the track base lines of said second pairs of tracks diverge from one another running from the aperture to the attaching part;
the track base lines of the outer ball tracks of said second pairs of tracks, at the attaching part end, comprise a first radius whose center is positioned on the first longitudinal axis and offset by a first offset from the central plane of the outer joint part towards the attaching part, and said track base lines diverge from a circle with said first radius outwardly towards the aperture end; and
the track base lines of the inner ball tracks of said second pairs of tracks, at the aperture end, comprise a second radius whose center is positioned on the second longitudinal axis and offset by a second offset from the central plane of the inner joint part towards the aperture, and said track base lines diverge from a circle with said second radius outwardly towards the attaching part end.

2. A joint according to claim 1, wherein the track base lines of the second pairs of tracks each comprise a circular-arch-shaped portion with the respective first and second radius and a tangentially adjoining straight line portion.

3. A joint according to claim 1, wherein the track base lines of the second pairs of tracks each comprise a circular-arch-shaped portion with the respective first and second radius and a tangentially adjoining second circular-arch-shaped portion with a respective third and fourth radius which is greater than the respective first and second radius.

4. A joint according to claim 1, wherein the track base lines of the second pairs of tracks each comprise a first circular-arch-shaped portion with the respective first and second radius and a second circular-arch-shaped portion curved in the opposite direction and having a respective third and fourth radius and a tangentially adjoining straight line.

5. A joint according to claim 1, wherein the track base lines of the second pairs of tracks each comprise a first circular-arch-shaped portion with the respective first and second radius, a first tangentially adjoining straight line portion, a second circular-arch-shaped portion curved in the direction opposite to that of the first portion and having a respective third and fourth radius and a second tangentially adjoining straight line.

* * * * *